(12) United States Patent
Tsumori et al.

(10) Patent No.: US 7,200,335 B2
(45) Date of Patent: Apr. 3, 2007

(54) OPTICAL TRANSCEIVER

(75) Inventors: Masahiko Tsumori, Kyoto (JP); Haruo Tanaka, Kyoto (JP); Tomohiro Yamazaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 563 days.

(21) Appl. No.: 10/229,748

(22) Filed: Aug. 28, 2002

(65) Prior Publication Data

US 2003/0048511 A1    Mar. 13, 2003

(30) Foreign Application Priority Data

Sep. 7, 2001    (JP)    ............................. 2001-271703

(51) Int. Cl.
*H04B 10/00*    (2006.01)

(52) U.S. Cl. ...................... 398/135; 398/136; 398/138; 398/139; 398/118; 398/119; 398/128; 398/129; 398/130; 398/131; 398/122; 398/115; 398/164; 398/41; 398/42; 385/31; 385/35; 385/88; 385/89; 385/92; 385/93; 385/94; 385/38; 385/48

(58) Field of Classification Search ................ 398/139, 398/135, 136, 138, 41, 118, 42, 119, 164, 398/128, 122, 129, 130, 131, 115; 385/35, 385/31, 88, 89, 92, 93, 94, 33, 38, 48
See application file for complete search history.

(56) References Cited

U.S. PATENT DOCUMENTS 4,767,171 A * 8/1988 Keil et al. ..................... 385/35

(Continued)

FOREIGN PATENT DOCUMENTS

JP    04-289743    10/1992

(Continued)

*Primary Examiner*—Hanh Phan
(74) *Attorney, Agent, or Firm*—Hedman & Costigan P.C.; James V. Costigan

(57) ABSTRACT

An optical transceiver is equipped with at least one coupling lens which condenses reception signal light from an optical medium and condenses transmission signal light to the optical medium, an optical plate which passes the reception signal light and reflects the transmission signal light, a light receiving element which receives the reception signal light passed through the optical plate, and a light emitting element which transmits the transmission signal light so as to be reflected by the optical plate, wherein an emission port of the transmission signal light of the light emitting element is arranged at a position to enable the transmission signal light from the light emitting element to form an image in the optical medium via the optical plate and the coupling lens, and wherein the emission port of the transmission signal light of the light emitting element is arranged in a direction that makes the incident angle formed on the optical plate by the beam center line of the transmission signal light transmitted from the light emitting element larger than the incident angle of the beam center line for maximally condensing the transmission signal light from the light emitting element to the optical medium in order to move the beam center line of the transmission signal light from the light emitting element away from the light receiving element, whereby it becomes possible to reduce the near-end crosstalk from the light emitting element to the light receiving element in the optical transceiver.

12 Claims, 8 Drawing Sheets

U.S. PATENT DOCUMENTS

| | | | | |
|---|---|---|---|---|
| 5,552,918 A | * | 9/1996 | Krug et al. | 398/139 |
| 6,142,680 A | | 11/2000 | Kikuchi et al. | |
| 6,351,584 B1 | * | 2/2002 | Horie et al. | 385/31 |
| 6,353,491 B1 | * | 3/2002 | Tanaka et al. | 398/139 |
| 6,374,021 B1 | * | 4/2002 | Nakanishi et al. | 385/49 |
| 6,433,942 B1 | * | 8/2002 | Memezawa et al. | 359/833 |

FOREIGN PATENT DOCUMENTS

| | | |
|---|---|---|
| JP | 08-210505 | 7/1996 |
| JP | 09-183810 | 7/1997 |
| JP | 11-346298 | 12/1999 |
| JP | 2001-54705 | 2/2001 |

* cited by examiner

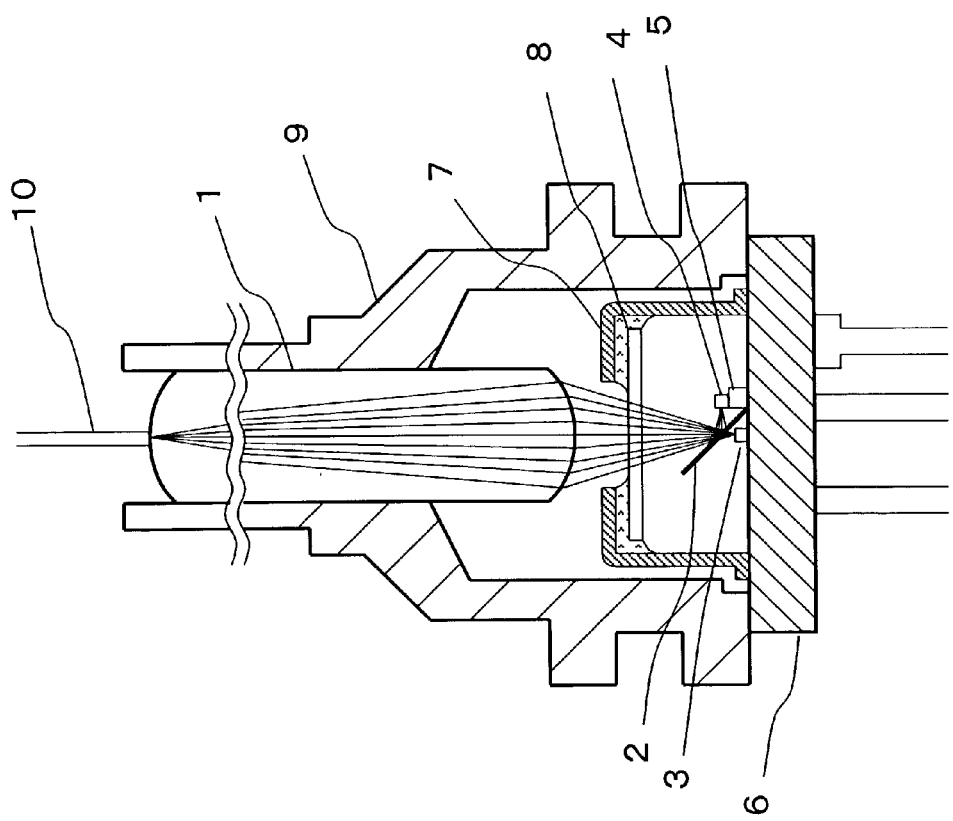

OPTICAL TRANSCEIVER

BACKGROUND OF THE INVENTION

1. Field of the Invention

The present invention is related to an optical transceiver which carries out bi-directional communication simultaneously with the same or different wavelengths using one optical fiber for transmission and reception, or an optical transceiver which carries out reading and writing operations on an optical disc.

2. Description of the Prior Art

The prior art will be described with reference to FIG. 1a and FIG. 1b. FIG. 1a is a rough explanatory drawing of an example prior art optical transceiver, and FIG. 1b is a rough explanatory drawing of a main portion thereof. This prior art example is an optical transceiver which is used in a same wavelength, time division multiplexing, single-fiber bi-directional transmission system.

Namely, the same wavelength, time division multiplexing, single-fiber, bi-directional transmission system is a system which uses the same wavelength for the upstream signals and the downstream signals, and refers to a system in which the transmission and reception times of the upstream signals and the downstream signals are divided periodically, with the upstream signals being transmitted during a certain time period, and the downstream signals being transmitted during another time period, whereby a bi-directional transmission of upstream signals and downstream signals is achieved by a single fiber.

In FIG. 1a, roughly half of the reception signal light from an optical transmission path 10 condensed by a coupling lens 61 passes through a half mirror 62 and is received by a light receiving element 63. Further, roughly half of the transmission signal light from a light emitting element 64 is reflected by the half mirror 62 and condensed in the optical transmission path 10 by the coupling lens 61.

In FIG. 1b, when the transmission signal light beam from the light emitting element 64 expands, a portion of the transmission signal light from the emission port of the light emitting element 64 passes through the half mirror 62 and is incident on the light receiving element 63. In the same wavelength, time division multiplexing, single-fiber, bi-directional transmission system, because the time period for transmitting and receiving the upstream signals and the time period for transmitting and receiving the downstream signals are separated, in principle, even when a portion of the transmission signal light from the light emitting element 64 reaches the light receiving element 63, there will be no interfere with reception. However, when high-level reception signal light is incident on the light receiving element during the transmission state, the reception circuit is temporarily blinded, and there is the risk that reception can not be carried out normally at the time when operations switch from the transmission state to the reception state.

Further, in a same wavelength, direction division multiplexing, single-fiber, bi-directional transmission system, or in a wavelength division multiplexing, single-fiber, bi-directional transmission system, because the upstream signals and the downstream signals are simultaneously transmitted and received, in the structure shown in FIG. 1a and FIG. 1b, a portion of the transmission signal light from the light emitting element 64 reaches the light receiving element 63, and this forms near-end crosstalk. For this reason, it is not possible to apply the optical transceiver having the prior art structure shown in FIG. 1a and FIG. 1b.

Furthermore, the same wavelength, direction division multiplexing, single-fiber, bi-directional transmission system uses the same wavelength for the transmission and reception of the upstream signals and the transmission and reception of the downstream signals, and refers to a system in which an optical coupler such as a half mirror or the like is used to transmit and receive the upstream signals and the downstream signals simultaneously in order to achieve a bi-directional transmission by a single fiber. Further, the wavelength division multiplexing, single-fiber, bi-directional transmission system uses different wavelengths for the transmission and reception of the upstream signals and the transmission and reception of the downstream signals, and refers to a system in which a wavelength filter is used to transmit and receive the upstream signals and the downstream signals simultaneously in order to achieve a bi-directional transmission by a single fiber.

SUMMARY OF THE INVENTION

In view of the problems of the prior art described above, it is an object of the present invention to provide an optical transceiver which makes it possible to adjust the emission direction of the transmission signal light from the light emitting element in order to minimize near-end crosstalk of the transmission signal light sent from the light emitting element to the light receiving element inside the apparatus.

In order to achieve the object stated above, the optical transceiver according to the invention of Claim 1 is equipped with at least one coupling lens which condenses reception signal light from an optical medium and condenses transmission signal light to the optical medium, an optical plate which passes the reception signal light and reflects the transmission signal light, a light receiving element which receives the reception signal light passed through the optical plate, and a light emitting element which transmits the transmission signal light so as to be reflected by the optical plate. The passing and reflecting of light by the optical plate in Claim 1 can be reversed to give the invention of Claim 2. Namely, the optical transceiver according to the invention of Claim 2 is equipped with at least one coupling lens which condenses reception signal light from an optical medium and condenses transmission signal light to the optical medium, an optical plate which reflects the reception signal light and passes the transmission signal light, a light receiving element which receives the reception signal light reflected from the optical plate, and a light emitting element which transmits the transmission signal light so as to be passed through the optical plate. In both inventions of Claim 1 and Claim 2, an emission port of the light emitting element is arranged at a position to enable the transmission signal light from the light emitting element to form an image on the optical medium via the optical plate and the coupling lens, and the emission port of the transmission signal light of the light emitting element is arranged in a direction that makes the incident angle formed on the optical plate by the beam center line of the transmission signal light transmitted from the light emitting element larger than the incident angle of the beam center line for maximally condensing the transmission signal light from the light emitting element to the optical medium.

In the inventions of Claim 1 and Claim 2, because the emission port of the light emitting element is arranged so that the transmission signal light from the light emitting element forms an image in the optical transmission path via the optical plate and the coupling lens, by adjusting the emission direction of the transmission signal light, the transmission signal light from the light emitting element is condensed in the optical transmission path. Further, because the beam of the transmission signal light from the light emitting element expands, even when the incident angle formed on the optical plate by the beam center line of the transmission signal light from the light emitting element is shifted slightly from the incident angle for maximally condensing the transmission signal light from the light emitting element to the optical transmission path, there is no drastic lowering of the amount of the transmission signal light from the light emitting element that is condensed to the optical transmission path.

Accordingly, when the incident angle formed on the optical plate by the beam center line of the transmission signal light from the light emitting element is made larger than the incident angle for maximally condensing the transmission signal light from the light emitting element to the optical transmission path, because the beam center line of the transmission signal light from the light emitting element is moved away from the light receiving element, it is possible to reduce the amount of the transmission signal light from the light emitting element that passes through the optical plate and is incident on the light receiving element inside the optical transceiver without a large lowering of the amount of the transmission signal light from the light emitting element that is condensed to the optical transmission path.

Further, the optical transceiver according to the invention of Claim 3 is equipped with at least one coupling lens which condenses reception signal light from an optical medium and condenses transmission signal light to the optical medium, an optical plate which passes the reception signal light and reflects the transmission signal light, a light receiving element which receives the reception signal light passed through the optical plate, and a laser diode which transmits the transmission signal light so as to be reflected by the optical plate. The passing and reflecting of light by the optical plate in Claim 3 can be reversed to give the invention of Claim 4. Namely, the optical transceiver according to the invention of Claim 4 is equipped with at least one coupling lens which condenses reception signal light from an optical medium and condenses transmission signal light to the optical medium, an optical plate which reflects the reception signal light and passes the transmission signal light, a light receiving element which receives the reception signal light reflected from the optical plate, and a laser diode which transmits the transmission signal light so as to be passed through the optical plate. In both inventions of Claim 3 and Claim 4, an emission port of the laser diode is arranged at a position to enable the transmission signal light from the laser diode to form an image in the optical medium via the optical plate and the coupling lens, and the substrate plane of the laser diode is perpendicular to the optical plate and is arranged parallel to a plane which includes the laser diode and the light receiving element.

The inventions of Claim 3 and Claim 4 make use of the fact that the expansion of the beam of the transmission signal light of the laser diode in the direction parallel to the substrate plane of the laser diode is smaller than the expansion in the perpendicular direction. Normally, the laser diode is mounted to the top surface of the submount. In this type of arrangement, the substrate plane of the laser diode is parallel to the top surface of the submount.

However, in the inventions of Claim 3 and Claim 4, the laser diode is mounted to a surface perpendicular to the top surface of the submount. As a result, because the beam expansion of the transmission signal light from the laser diode inside the plane that includes the laser diode and the light receiving element and which is perpendicular to the plane of the optical plate is smaller than the beam expansion for the case where the substrate plane of the laser diode is mounted parallel to the top surface of the submount, it is possible to reduce the amount of the transmission signal light from the light emitting element that passes through the optical plate and is incident on the light receiving element inside the optical transceiver.

The invention of Claim 5 is the invention of Claim 3, wherein the emission port of the laser diode is arranged at a position that makes the incident angle formed on the optical plate by the beam center line of the transmission signal light transmitted from the laser diode larger than the incident angle of the beam center line for maximally condensing the transmission signal light from the laser diode to the optical medium.

The invention of Claim 6 is the invention of Claim 4, wherein the emission port of the laser diode is arranged at a position that makes the incident angle formed on the optical plate by the beam center line of the transmission signal light transmitted from the laser diode larger than the incident angle of the beam center line for maximally condensing the transmission signal light from the laser diode to the optical medium.

The inventions of Claim 5 and Claim 6 make use of the fact that the expansion of the beam of the transmission signal light of the laser diode in the direction parallel to the substrate plane of the laser diode is smaller than the expansion in the perpendicular direction. Namely, the optical transceiver can be designed so that the maximum beam expansion angle of the transmission signal light from the laser diode that is condensed to the optical transmission path via the optical plate and the coupling lens is larger than the beam expansion angle of the transmission signal light from the laser diode in the direction perpendicular to the substrate plane of the laser diode. In this type of design, even when the emission direction of the transmission signal light from the laser diode is shifted slightly from the optimum value, there is no lowering of the amount of the transmission signal light from the laser diode that is condensed to the optical transmission path.

Accordingly, in the inventions of Claim 5 and Claim 6, by making the incident angle formed on the optical plate by the beam center line of the transmission signal light from the laser diode larger than the incident angle of the beam center line for maximally condensing the transmission signal light from the laser diode to the optical transmission path, it is possible to reduce the amount of the transmission signal light from the laser diode that passes through the optical plate and is incident on the light receiving element inside the optical transceiver without lowering the amount of the transmission signal light from the laser diode that is condensed to the optical transmission path.

In a same wavelength, time division multiplexing, single-fiber, bi-directional transmission system or a same wavelength, direction division multiplexing, single-fiber, bi-directional transmission system, a bi-directional transmission is achieved with a single optical fiber using the same wavelength for the transmission signal light and the reception signal light. Accordingly, a half mirror is used to separate the transmission signal light and the reception signal light which have the same wavelength. Further, in a wavelength division multiplexing, single-fiber, bi-directional transmission system, a bi-directional transmission is achieved with a single optical fiber using different wavelengths for the transmission signal light and the reception signal light. Accordingly, a wavelength filter is used to separate the transmission signal light and the reception signal light which have different wavelengths.

The inventions of Claim 7 through Claim 18 apply limitations to the optical plate of the inventions of Claim 1 through Claim 6.

Namely, the optical transceiver according to the invention of Claim 7 is the optical transceiver according to the invention of Claim 1, wherein the optical plate is a half mirror which passes one portion of incident light and reflects the remaining portion regardless of the wavelength.

In the invention of Claim 7, by limiting the optical plate of Claim to a half mirror, it becomes possible to reduce the near-end crosstalk from the light emitting element to the light receiving element in the optical transceiver that causes problems in a same wavelength, time division multiplexing, single-fiber, bi-directional transmission system or a same wavelength, direction division multiplexing, single-fiber, bi-directional transmission system.

Namely, the optical transceiver according to the invention of Claim 8 is the optical transceiver according to the invention of Claim 2, wherein the optical plate is a half mirror which passes one portion of incident light and reflects the remaining portion regardless of the wavelength.

In the invention of Claim 8, by limiting the optical plate of Claim 2 to a half mirror, it becomes possible to reduce the near-end crosstalk from the light emitting element to the light receiving element in the optical transceiver that causes problems in a same wavelength, time division multiplexing, single-fiber, bi-directional transmission system or a same wavelength, direction division multiplexing, single-fiber, bi-directional transmission system.

Further, the optical transceiver according to the invention of Claim 9 is the optical transceiver according to the invention of Claim 3, wherein the optical plate is a half mirror which passes one portion of incident light and reflects the remaining portion regardless of the wavelength.

In the invention of Claim 9, by limiting the optical plate of Claim 3 to a half mirror, it becomes possible to reduce the near-end crosstalk from the laser diode to the light receiving element in the optical transceiver that causes problems in a same wavelength, time division multiplexing, single-fiber, bi-directional transmission system or a same wavelength, direction division multiplexing, single-fiber, bi-directional transmission system.

Further, the optical transceiver according to the invention of Claim 10 is the optical transceiver according to the invention of Claim 4, wherein the optical plate is a half mirror which passes one portion of incident light and reflects the remaining portion regardless of the wavelength.

In the invention of Claim 10, by limiting the optical plate of Claim 4 to a half mirror, it becomes possible to reduce the near-end crosstalk from the laser diode to the light receiving element in the optical transceiver that causes problems in a same wavelength, time division multiplexing, single-fiber, bi-directional transmission system or a same wavelength, direction division multiplexing, single-fiber, bi-directional transmission system.

Further, the optical transceiver according to the invention of Claim 11 is the optical transceiver according to the invention of Claim 5, wherein the optical plate is a half mirror which passes one portion of incident light and reflects the remaining portion regardless of the wavelength.

In the invention of Claim 11, by limiting the optical plate of Claim 5 to a half mirror, it becomes possible to reduce the near-end crosstalk from the laser diode to the light receiving element in the optical transceiver that causes problems in a same wavelength, time division multiplexing, single-fiber, bi-directional transmission system or a same wavelength, direction division multiplexing, single-fiber, bi-directional transmission system.

Further, the optical transceiver according to the invention of Claim 12 is the optical transceiver according to the invention of Claim 6, wherein the optical plate is a half mirror which passes one portion of incident light and reflects the remaining portion regardless of the wavelength.

In the invention of Claim 12, by limiting the optical plate of Claim 6 to a half mirror, it becomes possible to reduce the near-end crosstalk from the laser diode to the light receiving element in the optical transceiver that causes problems in a same wavelength, time division multiplexing, single-fiber, bi-directional transmission system or a same wavelength, direction division multiplexing, single-fiber, bi-directional transmission system.

Further, the optical transceiver according to the invention of Claim 13 is the optical transceiver according to the invention of Claim 1, wherein the optical plate is a wavelength filter which reflects light having a prescribed wavelength from the incident light, and passes the remaining light.

In the invention of Claim 13, by limiting the optical plate of Claim 1 to a wavelength filter, it becomes possible to reduce the near-end crosstalk from the light emitting element to the light receiving element in the optical transceiver that causes problems in a wavelength division multiplexing, single-fiber, bi-directional transmission system.

Further, the optical transceiver according to the invention of Claim 14 is the optical transceiver according to the invention of Claim 2, wherein the optical plate is a wavelength filter which reflects light having a prescribed wavelength from the incident light, and passes the remaining light.

In the invention of Claim 14, by limiting the optical plate of Claim 2 to a wavelength filter, it becomes possible to reduce the near-end crosstalk from the light emitting element to the light receiving element in the optical transceiver that causes problems in a wavelength division multiplexing, single-fiber, bi-directional transmission system.

Further, the optical transceiver according to the invention of Claim 15 is the optical transceiver according to the invention of Claim 3, wherein the optical plate is a wavelength filter which reflects light having a prescribed wavelength from the incident light, and passes the remaining light.

In the invention of Claim 15, by limiting the optical plate of Claim 3 to a wavelength filter, it becomes possible to reduce the near-end crosstalk from the laser diode to the light receiving element in the optical transceiver that causes problems in a wavelength division multiplexing, single-fiber, bi-directional transmission system.

Further, the optical transceiver according to the invention of Claim 16 is the optical transceiver according to the invention of Claim 4, wherein the optical plate is a wavelength filter which reflects light having a prescribed wavelength from the incident light, and passes the remaining light.

In the invention of Claim 16, by limiting the optical plate of Claim 4 to a wavelength filter, it becomes possible to reduce the near-end crosstalk from the laser diode to the light receiving element in the optical transceiver that causes problems in a wavelength division multiplexing, single-fiber, bi-directional transmission system.

Further, the optical transceiver according to the invention of Claim 17 is the optical transceiver according to the invention of Claim 5, wherein the optical plate is a wavelength filter which reflects light having a prescribed wavelength from the incident light, and passes the remaining light.

In the invention of Claim 17, by limiting the optical plate of Claim 5 to a wavelength filter, it becomes possible to reduce the near-end crosstalk from the laser diode to the light receiving element in the optical transceiver that causes problems in a wavelength division multiplexing, single-fiber, bi-directional transmission system.

Further, the optical transceiver according to the invention of Claim 18 is the optical transceiver according to the invention of Claim 6, wherein the optical plate is a wavelength filter which reflects light having a prescribed wavelength from the incident light, and passes the remaining light.

In the invention of Claim 18, by limiting the optical plate of Claim 6 to a wavelength filter, it becomes possible to reduce the near-end crosstalk from the laser diode to the light receiving element in the optical transceiver that causes problems in a wavelength division multiplexing, single-fiber, bi-directional transmission system.

Furthermore, the optical medium described above can be thought to be an optical transmission path which is an optical transmission medium or an optical disc which is an optical recording medium. Accordingly, the present invention can be applied to an optical transceiver connected to an optical transmission path or an optical transceiver which carries out reading and writing operations on an optical disc.

In the descriptions given above, a single coupling lens is used in common for condensing the transmission signal light from the light emitting element and for condensing the reception signal light to the light receiving element, but it is also possible to separately provide one or a group of lenses respectively for collimating the transmission signal light from the light emitting element and for condensing the reception signal light to the light receiving element.

BRIEF DESCRIPTION OF THE DRAWINGS

FIG. 2*a* is a rough explanatory drawing of a first embodiment of an optical transceiver according to the present invention.

DETAILED DESCRIPTION OF THE PREFERRED EMBODIMENTS

A detailed description of the preferred embodiments of the present invention will be described below with reference to the drawings.

First Embodiment of the Invention

Figure 1A:
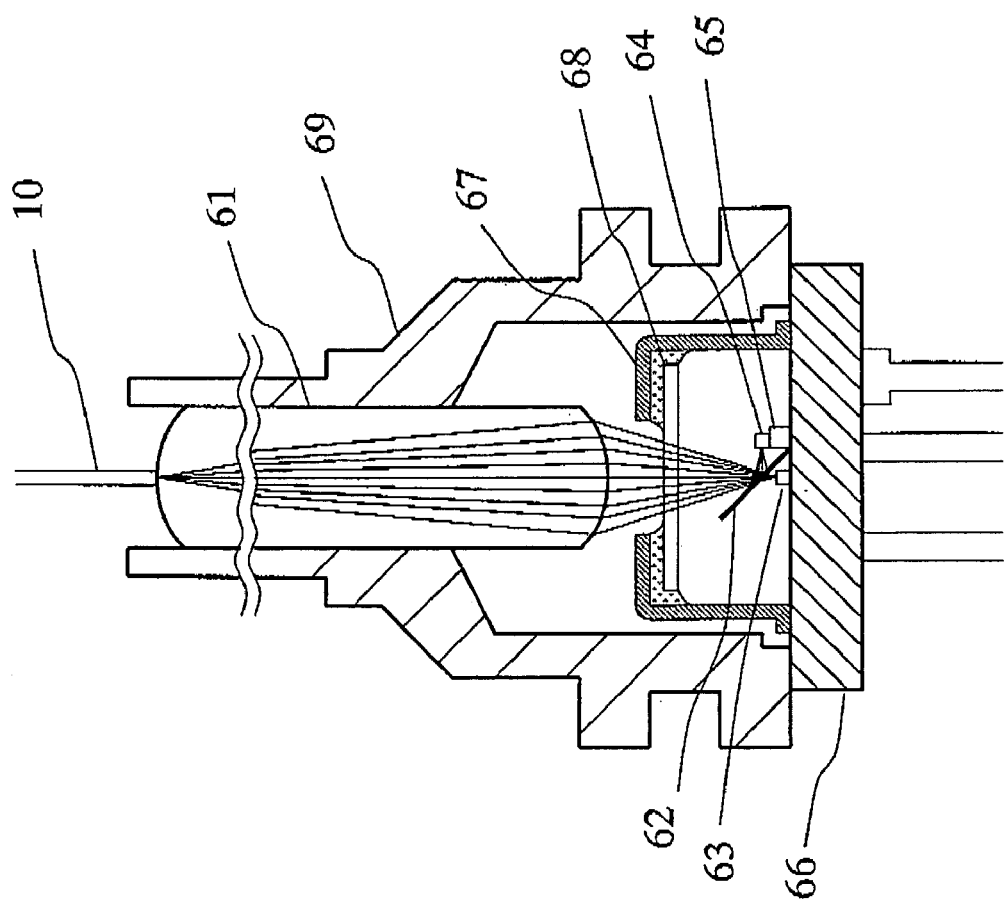
FIG. 1*a* is a rough explanatory drawing of an example prior art optical transceiver.
Figure 1B:
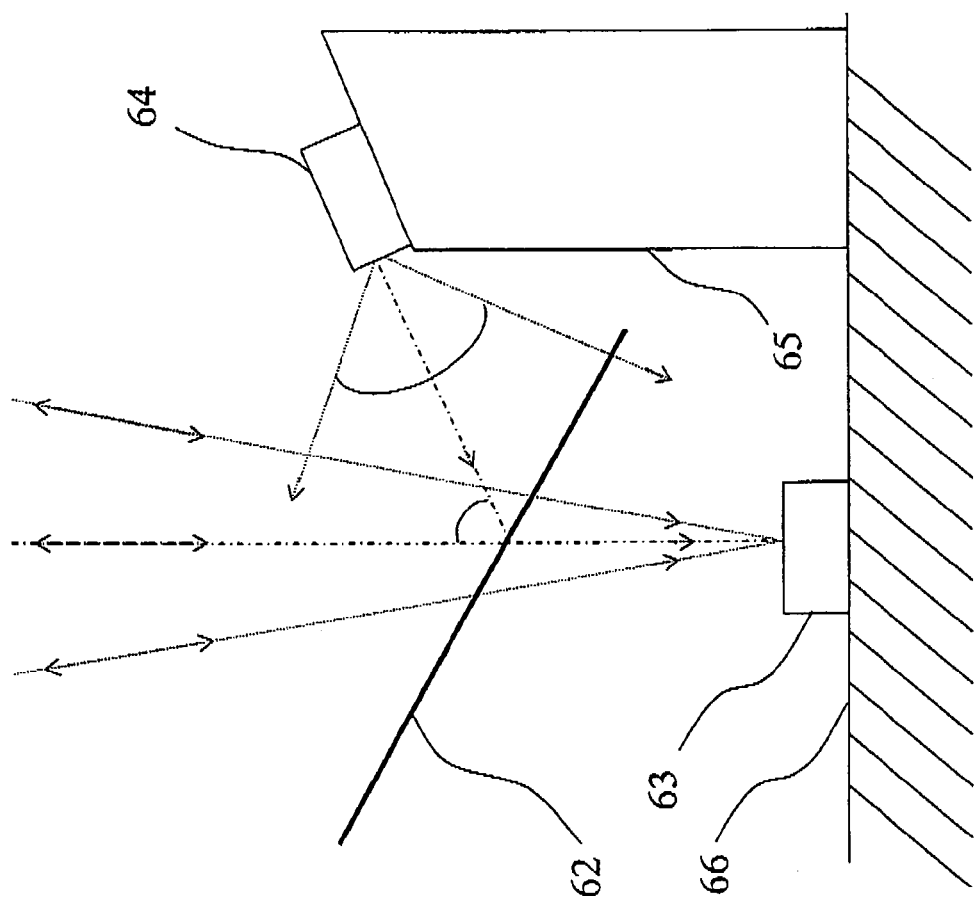
FIG. 1*b* is a rough explanatory drawing of a main portion of the example prior art optical transceiver.
Figure 2B:
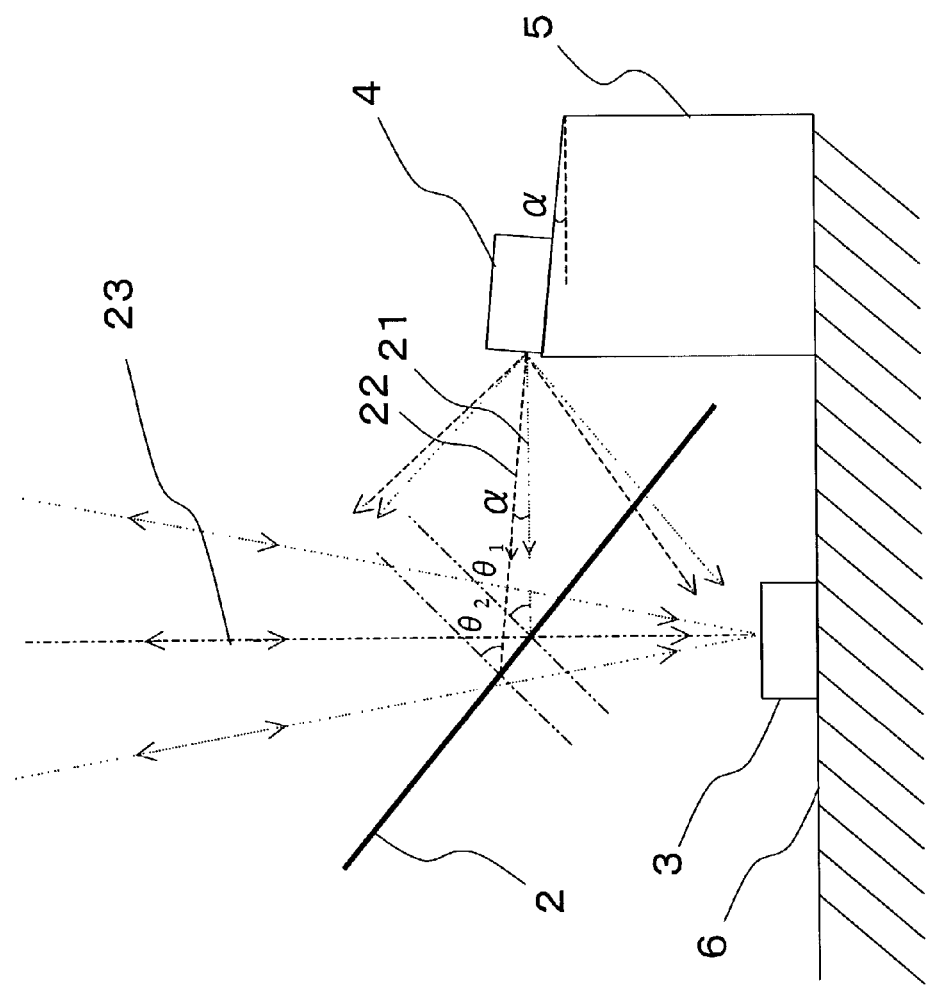
FIG. 2*b* is a rough explanatory drawing of a main portion of the first embodiment of an optical transceiver according to the present invention.

FIG. 2*a* and FIG. 2*b* show an embodiment of the present invention applied to a same wavelength, direction division multiplexing, single-fiber, bi-directional transmission system in which the optical plate is limited to a half mirror.

FIG. 2*a* is a rough explanatory drawing of an optical transceiver according to the present embodiment, and FIG. 2*b* is a rough explanatory drawing showing an enlarged view of a main portion thereof. In order to apply the optical transceiver to a same wavelength, direction division multiplexing, single-fiber, bi-directional transmission system, the present embodiment has the distinctive feature of being constructed so as to prevent near-end crosstalk caused by the transmission signal light from the light emitting element being incident on the light receiving element inside the optical transceiver. A detailed description is given below with reference to the drawings.

As shown in FIG. 2*a,* reception signal light from an optical transmission path 10 is condensed by a coupling lens 1, and a portion thereof passes through a half mirror 2 and is incident on a light receiving element 3. Further, a portion of transmission signal light from a light emitting element 4 mounted on a submount 5 is reflected by the half mirror 2 and condensed in the optical transmission path 10 by the coupling lens 1. These main portions are mounted to a stem 6, and the top is covered with a cap 7 equipped with a glass window 8 which enables the reception signal light and the transmission signal light to pass through. The coupling lens 1 is fixed to a housing 9, and the housing 9 is fixed to the stem 6.

The ratio of the transmittance and reflectance of the half mirror 2 is established anywhere in the range from 1:10 to 10:1.

The operations in FIG. 2*b* will now be described in detail. Namely, a portion of the reception signal light from the optical transmission path 10 passes through the half mirror 2 and is incident on the light receiving element 3. The remaining portion of the reception signal light is reflected by the half mirror 2 and reaches the light emitting element side. When the emission port (not shown in the drawings) of the light emitting element 4 is arranged at the position where the reception signal light condenses at the light emitting element side, if the emission direction of the transmission signal light of the light emitting element 4 is adjusted, the transmission signal light from the light emitting element 4 will pass through the half mirror 2 and the coupling lens 1 and form an image in the optical transmission path 10. At this position, when the point where the beam center line 21 of the transmission signal light emitted from the light emitting element 4 strikes the half mirror 2 and the point where the beam center line 23 of the reception signal light from the coupling lens 1 strikes the half mirror 2 are made to match each other, the transmission signal light from the light emitting element 4 can be condensed maximally in the optical transmission path 10. In this state, as shown in FIG. 2*b,* when the beam of the transmission signal light from the light emitting element 4 expands, because a portion thereof passes through the half mirror 2 and is incident on the light receiving element 3, near-end crosstalk is caused by such incident transmission signal light.

In this regard, instead of changing the position of the emission port of the light emitting element 4, the incident angle formed by the beam center line of the transmission signal light with respect to the half mirror 2 is increased. In FIG. 2b, when the light emitting element 4 is arranged parallel to the top surface of the submount 5, the beam center line 21 of the transmission signal light from the light emitting element 4 forms an incident angle $\theta_1$ with respect to the half mirror 2.

In the present embodiment, by arranging the light emitting element 4 to have an inclination angle $\alpha$ with respect to the top surface of the submount 5, the incident angle formed by the beam center line 22 with respect to the half mirror 2 is increased to $\theta_2$. By adjusting the emission direction of the transmission signal light from the light emitting element 4, the beam center line of the transmission signal light from the light emitting element 4 is rotated in a direction away from the light receiving element 3. In other words, when the incident angle formed by the beam center line of the transmission signal light from the light emitting element 4 with respect to the half mirror 2 is made larger than the incident angle for maximally condensing the transmission signal light from the light emitting element 4 to the optical transmission path 10, such angular difference makes it possible to reduce the amount of transmission signal light from the light emitting element 4 that is incident on the light receiving element 3 inside the optical transceiver.

As described above, because the amount of transmission signal light from the light emitting element 4 that is incident on the light receiving element 3 can be reduced, it is possible to reduce near-end crosstalk inside the optical transceiver.

In this regard, in the illustrated embodiment, the reception signal light from the coupling lens passes through the half mirror and is incident on the light receiving element, and the transmission signal light from the light emitting element is reflected by the half mirror and reaches the coupling lens, but the same results can be obtained in the case where the light emitting element and the light receiving element have the opposite positional relationship, namely, even when the optical transceiver is constructed so that the reception signal light from the coupling lens is reflected by the half mirror and is incident on the light receiving element, and the transmission signal light from the light emitting element passes through the half mirror and reaches the coupling lens.

Figure 3:
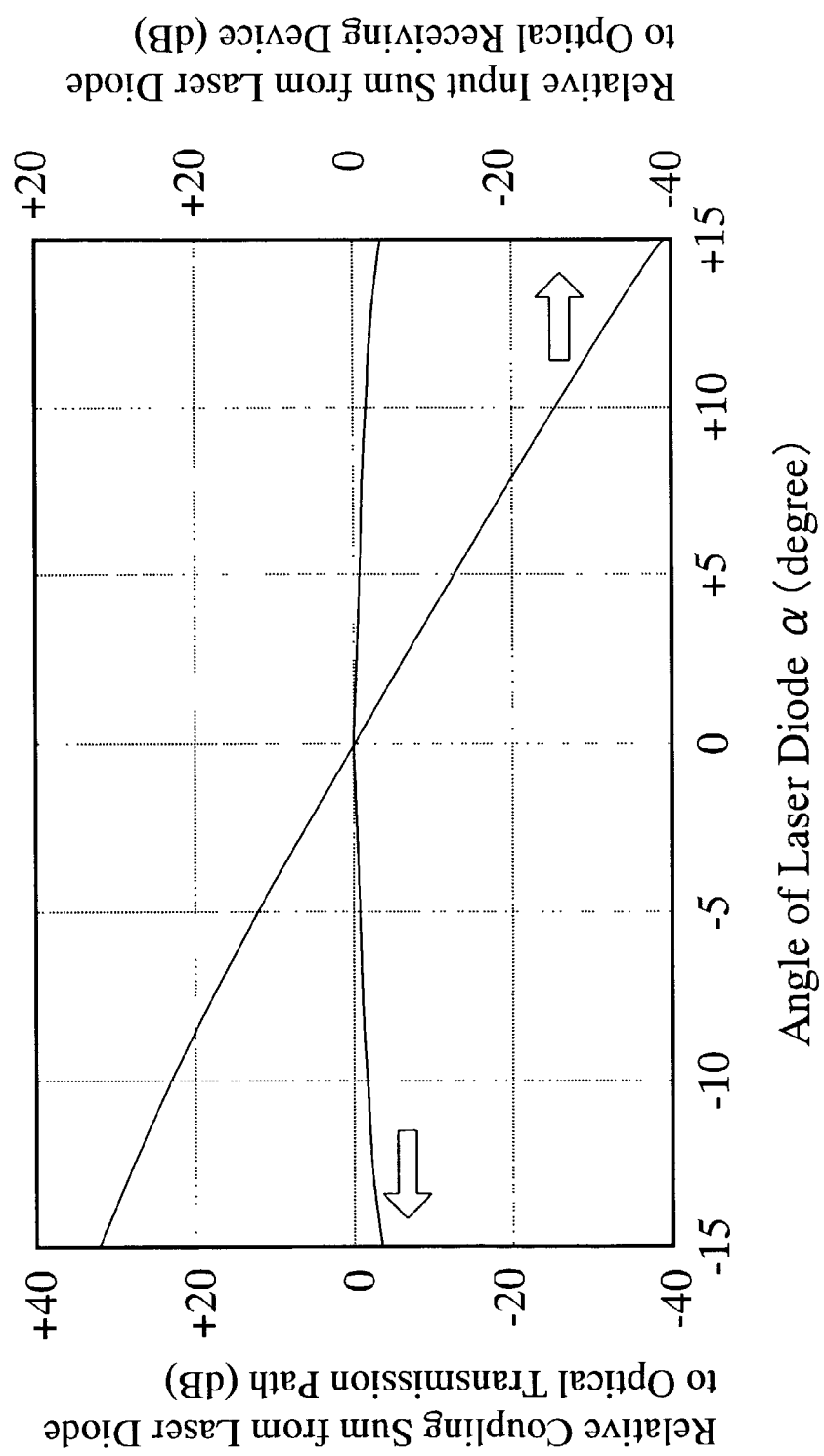
FIG. 3 is a graph of the calculated characteristics of the optical transceiver for describing the effect of the first embodiment of the present invention.

FIG. 3 is a graph of the calculated characteristics of the optical transceiver for describing the effect of the invention according to Claim 1. The horizontal axis in FIG. 3 is the inclination angle $\alpha$ (deg) of the laser diode in FIG. 2b, with the + direction being the direction which increases the inclination angle formed by the beam center line of the transmission signal light from the light emitting element 4 with respect to the half mirror 2. When a laser diode is used as the light emitting element, the left-side vertical axis in FIG. 3 represents the relative amount of condensation (dB) from the laser diode to the optical transmission path, and the right-side vertical axis represents the relative amount of incident light (dB) from the laser diode to the light receiving element inside the optical transceiver.

As is clear from FIG. 3, when the inclination angle $\alpha$ is 0, the transmission signal light from the laser diode is maximally condensed in the optical transmission path, and when the inclination angle $\alpha$ is moved in either direction from 0, the amount of condensed light from the laser diode to the optical transmission path is reduced slightly. However, when the inclination angle $\alpha$ of the laser diode is increased in the + direction, the amount of incident light from the laser diode to the light receiving element is reduced roughly in proportion to the inclination angle. At least for inclination angles $\alpha$ up to about 15 deg, the reduction of the amount of incident light from the laser diode to the light receiving element exceeds the reduction of the amount of condensed light from the laser diode to the optical transmission path. Accordingly, from the graph in FIG. 3, for inclination angles a in at least the range from 0 deg to 15 deg, by making the inclination angle formed by the beam center line of the transmission signal light from the laser diode with respect to the half mirror larger than the inclination angle for maximally condensing the transmission signal light from the laser diode to the optical transmission path, it was possible to reduce of the amount of light incident on the light receiving element inside the optical transceiver by a larger degree than the reduction of the amount of condensed light from the laser diode to the optical transmission path, and this made it possible to confirm the effectiveness of the present invention.

Second Embodiment of the Invention

Figure 4:
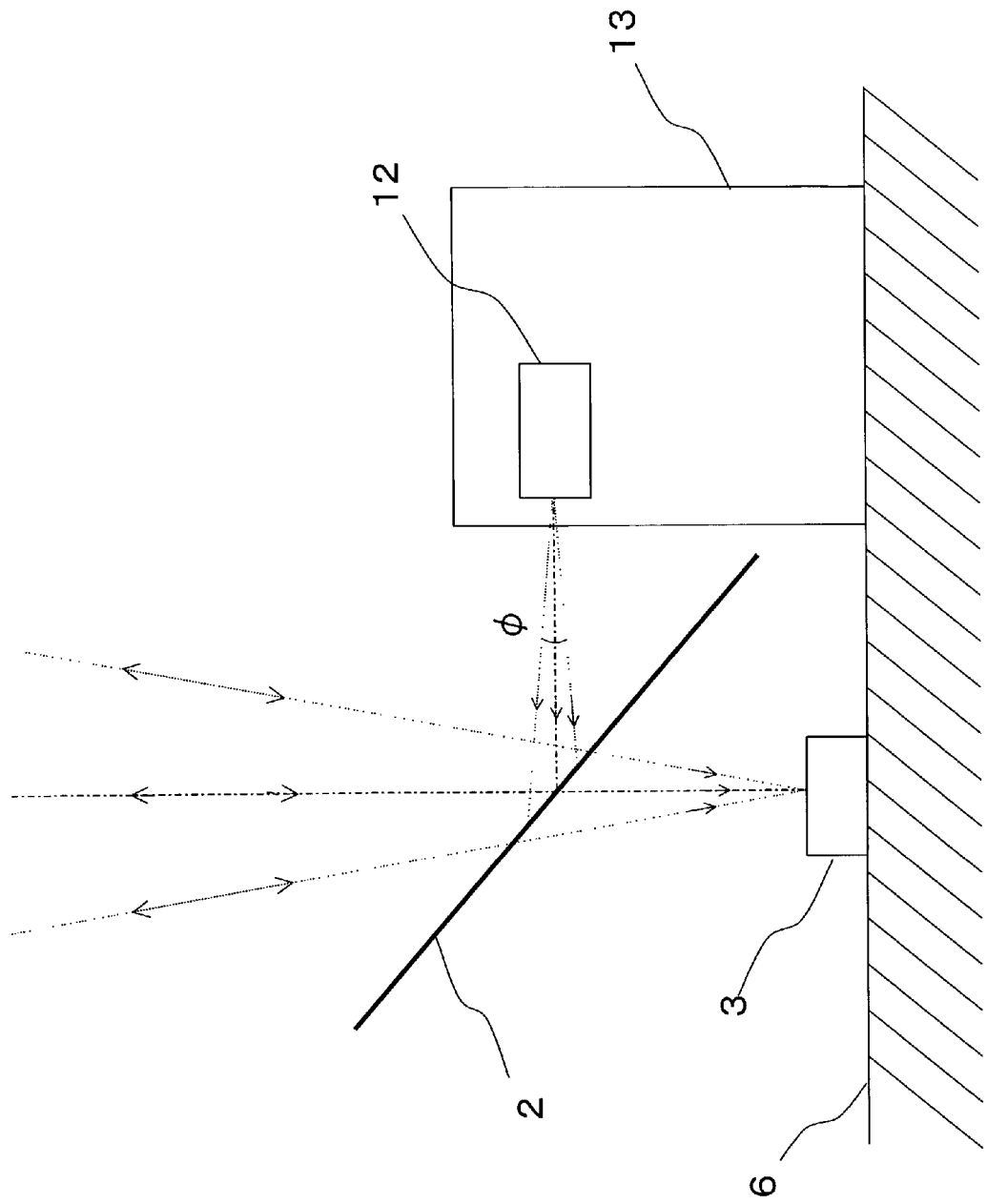
FIG. 4 is a rough explanatory drawing of a main portion of a second embodiment of an optical transceiver according to the present invention.

FIG. 4 shows an embodiment of the present invention applied to a same wavelength, direction division multiplexing, single-fiber, bi-directional transmission system in which the optical plate is formed by a half mirror.

FIG. 4 is a rough explanatory drawing showing an enlarged view of a main portion of the optical transceiver. In order to apply the optical transceiver to a same wavelength, direction division multiplexing, single-fiber, bi-directional transmission system, the present embodiment has the distinctive feature of being constructed so as to reduce near-end crosstalk caused by the transmission signal light from the light emitting element being incident on the light receiving element inside the optical transceiver.

A detailed description is given below with reference to the drawings. Namely, in order to make manufacturing easy, normally the laser diode is mounted to the top surface of the submount which is parallel to the top surface of the system. On the other hand, the expansion of the beam of the transmission signal light of the laser diode in the direction parallel to the substrate plane of the laser diode is smaller than the expansion in the perpendicular direction. In this regard, a laser diode 12 is mounted to a submount 13 so that the substrate plane of the laser diode 12 is perpendicular to the top surface of the stem 6. Further, by forming a surface perpendicular to the top surface of the stem 6 as a side surface of the submount 13 or in the top surface of the submount 13, and by mounting the laser diode 12 to such perpendicular surface, it is possible to arrange the substrate plane of the laser diode 12 perpendicular to the top surface of the stem 6.

In this arrangement, because the expansion of the beam of the transmission signal light of the laser diode 12 is small in the direction parallel to the substrate plane of the laser diode 12, namely, with respect to the surface perpendicular to the top surface of the stem 6, the transmission signal light from the laser diode 12 that passes through the half mirror 2 and is incident on the light receiving element 3 can be sufficiently suppressed.

As described in the present embodiment, because it is possible to prevent the needless incidence of transmission signal light from the laser diode to the light receiving element inside the optical transceiver, it is possible to reduce near-end crosstalk inside the optical transceiver.

In this regard, in the arrangement shown in FIG. 4, the reception signal light from the coupling lens passes through the half mirror and is incident on the light receiving element, and the transmission signal light from the laser diode is reflected by the half mirror and reaches the coupling lens, but the same results can be obtained in the case where the laser diode and the light receiving element have the opposite positional relationship, namely, even when the optical transceiver is constructed so that the reception signal light from the coupling lens is reflected by the half mirror and is incident on the light receiving element, and the transmission signal light from the laser diode passes through the half mirror and reaches the coupling lens.

Further, when the half mirror is replaced with a wavelength filter, the optical transceiver can be applied to a wavelength division multiplexing, single-fiber, bi-directional transmission system.

Third Embodiment of the Invention

Figure 5:
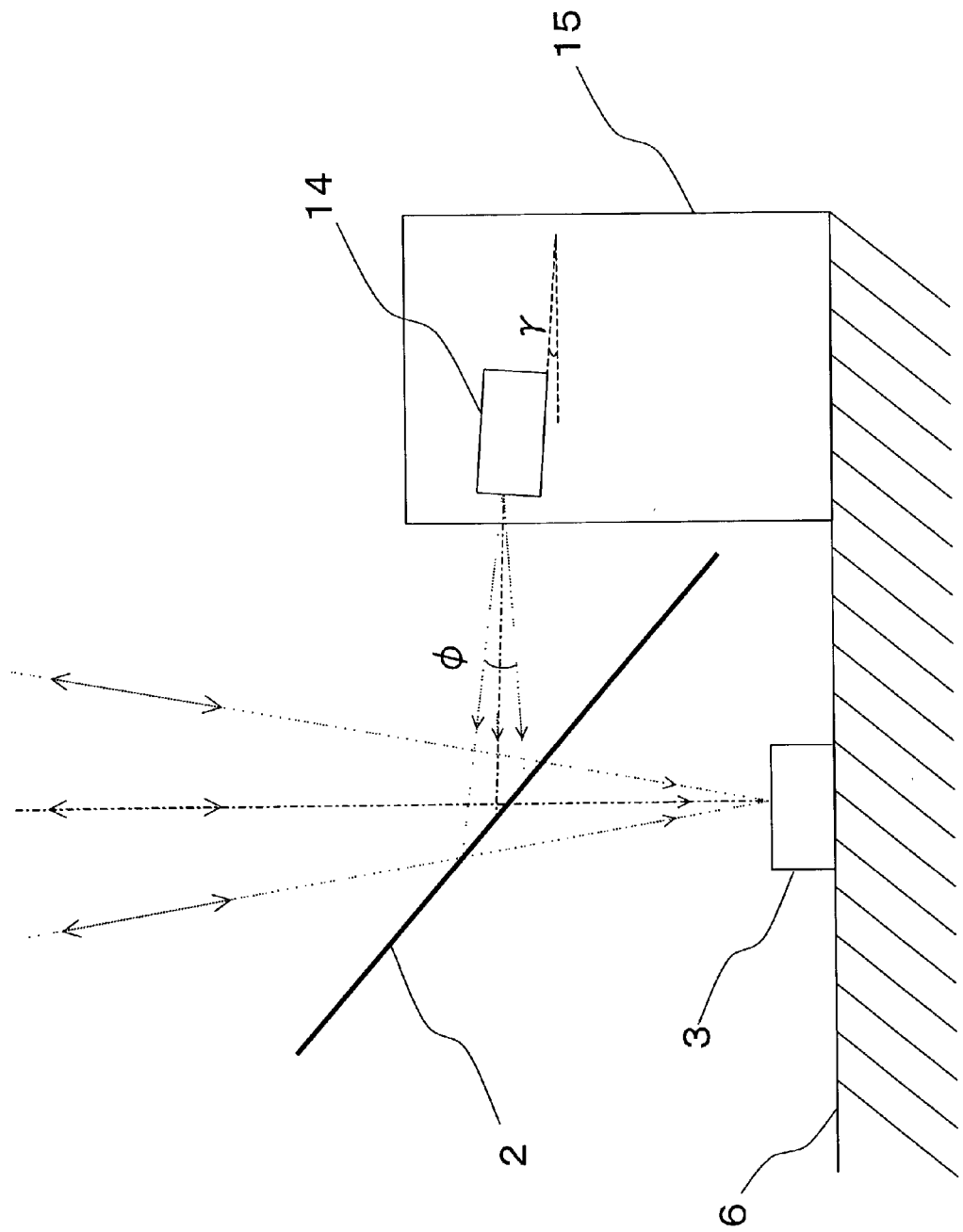
FIG. 5 is a rough explanatory drawing of a main portion of a third embodiment of an optical transceiver according to the present invention.

FIG. 5 shows an embodiment of the present invention applied to a same wavelength, direction division multiplexing, single-fiber, bi-directional transmission system in which the optical plate is formed by a half mirror. FIG. 5 is an enlarged view of a main portion of the optical transceiver. In this embodiment, when the beam expansion of the transmission signal light of a laser diode 14 is smaller than or equal to the original maximum beam expansion angle of the transmission signal light from the laser diode 14 condensed to the optical transmission path by the half mirror and the coupling lens, there is little degradation of the amount of the transmission signal light from the laser diode 14 condensed in the optical transmission path even when the emission direction of the transmission signal light from the laser diode 14 is moved slightly.

Namely, with the laser diode 14 mounted to a submount 15 so that the substrate plane of the laser diode 14 is perpendicular to the stem 6, when the incident angle formed by the beam center line of the transmission signal light with respect to the half mirror 2 is established so as to be larger than the incident angle for maximally condensing the transmission signal light from the laser diode 14 to the optical transmission path, the transmission signal light from the laser diode 14 that passes through the half mirror 2 and is incident on the light receiving element 3 can be sufficiently suppressed. In FIG. 5, by providing an inclination angle γ to the laser diode 14, the incident angle formed by the beam center line of the transmission signal light with respect to the half mirror 2 is made larger than the incident angle for maximally condensing the transmission signal light from the laser diode 14 to the optical transmission path.

As described in the present embodiment, because it is possible to prevent the needless incidence of transmission signal light from the laser diode to the light receiving element inside the optical transceiver, it is possible to reduce near-end crosstalk inside the optical transceiver.

In this regard, in the arrangement shown in FIG. 5, the reception signal light from the coupling lens passes through the half mirror and is incident on the light receiving element, and the transmission signal light from the laser diode is reflected by the half mirror and reaches the coupling lens, but the same results can be obtained in the case where the laser diode and the light receiving element have the opposite positional relationship, namely, even when the optical transceiver is constructed so that the reception signal light from the coupling lens is reflected by the half mirror and is incident on the light receiving element, and the transmission signal light from the laser diode passes through the half mirror and reaches the coupling lens.

Further, when the half mirror is replaced with a wavelength filter, the optical transceiver can be applied to a wavelength division multiplexing, single-fiber, bi-directional transmission system.

Fourth Embodiment of the Invention

Figure 6:
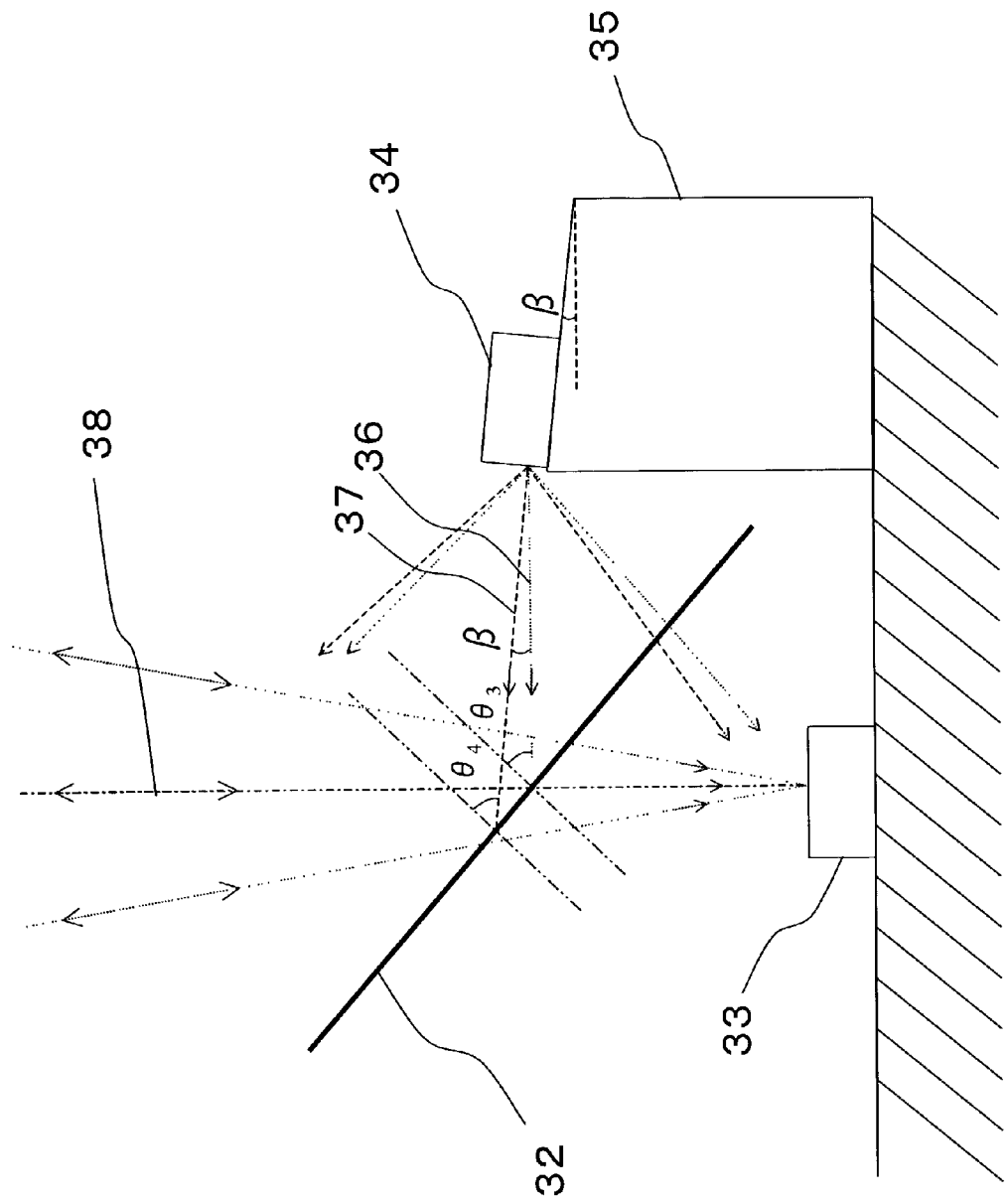
FIG. 6 is a rough explanatory drawing of a main portion of a fourth embodiment of an optical transceiver according to the present invention.

FIG. 6 shows an embodiment of the present invention applied to a wavelength division multiplexing, single-fiber, bi-directional transmission system in which the optical plate is formed by a wavelength filter. FIG. 6 is an explanatory drawing showing an enlarged view of a main portion of the optical transceiver. In this embodiment, the reception signal light from the optical transmission path passes through a wavelength filter 32 and is incident on a light receiving element 33. When the emission port (not shown in the drawing) of the transmission signal light from a light emitting element 34 is arranged at a position so that the transmission signal light from the light emitting element 34 will pass through the wavelength filter 32 and the coupling lens and form an image in the optical transmission path, the amount of transmission signal light from the light emitting element 34 condensed to the optical transmission path will reach a maximum when the beam center line 36 of the transmission signal light emitted from the light emitting element 34 matches the point where the beam center line 38 of the reception signal light from the coupling lens intersects the wavelength filter 32. In this state, as shown in FIG. 6, when the beam of the transmission signal light from the light emitting element 34 expands, because a portion thereof passes through the wavelength filter 32 and leaks onto the light receiving element 33, near-end crosstalk is caused by such incident transmission signal light.

In this regard, instead of changing the position of the emission port of the light emitting element 34, the incident angle formed by the beam center line of the transmission signal light with respect to the wavelength filter 32 is increased. In FIG. 6, when the light emitting element 34 is arranged parallel to the top surface of a submount 35, the beam center line 36 of the transmission signal light from the light emitting element 34 forms an incident angle $\theta_3$ with respect to the wavelength filter 32.

In the present embodiment, by arranging the light emitting element 34 to have an inclination angle β with respect to the top surface of the submount 35, the incident angle formed by the beam center line 37 with respect to the wavelength filter 32 is increased to $\theta_4$. When the emission direction of the transmission signal light of the light emitting element 34 is rotated so that the beam center line of the transmission signal light from the light emitting element 34 is rotated only by the angle β away from the light receiving element 33, it is possible to reduce the amount of transmission signal light of the light emitting element 34 that leaks onto the light receiving element 33 inside the optical transceiver.

As described above, because the transmission signal light from the light emitting element 34 that is incident on the light receiving element 33 can be prevented, it is possible to reduce near-end crosstalk inside the optical transceiver.

In this regard, in the arrangement shown in FIG. 6, the reception signal light from the coupling lens passes through the wavelength filter and is incident on the light receiving element, and the transmission signal light from the light emitting element is reflected by the wavelength filter and reaches the coupling lens, but the same results can be obtained in the case where the light emitting element and the light receiving element have the opposite positional relationship, namely, even when the optical transceiver is constructed so that the reception signal light from the coupling lens is reflected by the wavelength filter and is incident on the light receiving element, and the transmission signal light from the light emitting element passes through the wavelength filter and reaches the coupling lens.

Effect of the Invention

As can be understood from the descriptions given above, the present invention makes it possible to reduce the amount of transmission signal light from the light emitting element that passes through the optical plate such as a half mirror or wavelength filter or the like and is incident on the light receiving element inside the optical transceiver without lowering the amount of transmission signal light from the light emitting element that is condensed to the optical transmission path.

In accordance with the present invention, it becomes possible to reduce the near-end crosstalk from the light emitting element to the light receiving element in the optical transceiver that causes problems in a same wavelength, time division multiplexing, single-fiber, bi-directional transmission system, a same wavelength, direction division multiplexing, single-fiber, bi-directional transmission system, or a wavelength division multiplexing, single-fiber, bi-directional transmission system.

Further, the present invention makes it possible to reduce the amount of transmission light from the light emitting element that passes through the half mirror and is incident on the light receiving element inside the optical transceiver without lowering the amount of transmission light from the light emitting element that is condensed to an optical medium.

What is claimed is:

1. An optical transceiver, comprising:
    at least one coupling lens which condenses reception signal light from an optical medium and condenses transmission signal light to said optical medium;
    an optical plate which passes said reception signal light and reflects said transmission signal light;
    a light receiving element which receives said reception signal light passed through said optical plate; and
    a light emitting element which transmits said transmission signal light so as to be reflected by said optical plate;
    wherein the inclination angle of said light emitting element is increased in the + direction which increases the incident angle formed by the beam center line of said transmission signal light from said light emitting element with respect to said optical plate;
    wherein an emission port of said transmission signal light of said light emitting element is arranged at a position to enable said transmission signal light from said light emitting element to form an image in said optical medium via said optical plate and said coupling lens; and
    wherein said emission port of said transmission signal light of said light emitting element is arranged in a direction that makes the incident angle formed on said optical plate by the beam center line of said transmission signal light transmitted from said light emitting element larger than the incident angle of the beam center line for maximally condensing said transmission signal light from said light emitting element to said optical medium, so that the amount of the transmission signal light from the light emitting element that passes through the optical plate and is incident directly on the light receiving element inside the optical transceiver is reduced.

2. The optical transceiver described in claim 1, wherein said optical plate is a half mirror.

3. The optical transceiver described in claim 1, wherein said optical plate is a wavelength filter.

4. An optical transceiver, comprising:
    at least one coupling lens which condenses reception signal light from an optical medium and condenses transmission signal light to said optical medium;
    an optical plate which reflects said reception signal light and passes said transmission signal light;
    a light receiving element which receives said reception signal light reflected from said optical plate; and
    a light emitting element which transmits said transmission signal light so as to be passed through said optical plate;
    wherein the inclination angle of said light emitting element is increased in the + direction which increases the incident angle formed by the beam center line of said transmission signal light from said light emitting element with respect to said optical plate;
    wherein an emission port of said transmission signal light of said light emitting element is arranged at a position to enable said transmission signal light from said light emitting element to form an image in said optical medium via said optical plate and said coupling lens; and
    wherein said emission port of said transmission signal light of said light emitting element is arranged in a direction that makes the incident angle formed on said optical plate by the beam center line of said transmission signal light transmitted from said light emitting element larger than the incident angle of the beam center line for maximally condensing said transmission signal light from said light emitting element to said optical medium, so that the amount of the transmission signal light from the light emitting element that passes through the optical plate and is incident directly on the light receiving element inside the optical transceiver is reduced.

5. The optical transceiver described in claim 4, wherein said optical plate is a half mirror.

6. The optical transceiver described in claim 4, wherein said optical plate is a wavelength filter.

7. An optical transceiver, comprising:
    at least one coupling lens which condenses reception signal light from an optical medium and condenses transmission signal light to said optical medium;
    an optical plate which passes said reception signal light and reflects said transmission signal light;
    a light receiving element which receives said reception signal light passed through said optical plate; and
    a laser diode which transmits said transmission signal light so as to be reflected by said optical plate;
    wherein the inclination angle of said laser diode is increased in the + direction which increases the incident angle formed by the beam center line of said transmission signal light from said laser diode with respect to said optical plate;
wherein an emission port of said laser diode is arranged at a position to enable said transmission signal light from said laser diode to form an image in said optical medium via said optical plate and said coupling lens; and
wherein said emission port of said laser diode is arranged at a position that makes the incident angle formed on said optical plate by the beam center line of said transmission signal light transmitted from said laser diode larger than the incident angle of the beam center line for maximally condensing said transmission signal light from said laser diode to said optical medium, and a substrate plane of said laser diode is perpendicular to said optical plate and is arranged parallel to a plane which includes said laser diode and said light receiving element.

8. The optical transceiver described in claim 7, wherein said optical plate is a half mirror.

9. The optical transceiver described in claim 7, wherein said optical plate is a wave length filter.

10. An optical transceiver, comprising:
at least one coupling lens which condenses reception signal light from an optical medium and condenses transmission signal light to said optical medium;
an optical plate which reflects said reception signal light and passes said transmission signal light;
a light receiving element which receives said reception signal light reflected from said optical plate; and
a laser diode which transmits said transmission signal light so as to be passed through said optical plate;
wherein the inclination angle of said laser diode is increased in the + direction which increases the incident angle formed by the beam center line of said transmission signal light from said laser diode with respect to said optical plate;
wherein an emission port of said laser diode is arranged at a position to enable said transmission signal light from said laser diode to form an image in said optical medium via said optical plate and said coupling lens; and wherein said emission port of said laser diode is arranged at a position that makes the incident angle formed on said optical plate by the beam center line of said transmission signal light transmitted from said laser diode larger than the incident angle of the beam center line for maximally condensing said transmission signal light from said laser diode to said optical medium, and a substrate plane of said laser diode is perpendicular to said optical plate and is arranged parallel to a plane which includes said laser diode and said light receiving element.

11. The optical transceiver described in claim 10, wherein said optical plate is a half mirror.

12. The optical transceiver described in claim 10, wherein said optical plate is a wavelength filter.

* * * * *